United States Patent [19]

Hauck et al.

[11] Patent Number: 4,972,354

[45] Date of Patent: Nov. 20, 1990

[54] PROCESSOR-CONTROLLED DATA INPUT AND OUTPUT DEVICE

[75] Inventors: Dieter Hauck, Eberbach; Jürgen Rehberger, Dossenheim, both of Fed. Rep. of Germany

[73] Assignee: Heidelberger Druckmaschinen AG, Heidelberg, Fed. Rep. of Germany

[21] Appl. No.: 209,294

[22] Filed: Jun. 20, 1988

[30] Foreign Application Priority Data

Jun. 19, 1987 [DE] Fed. Rep. of Germany ....... 3720272

[51] Int. Cl.$^5$ .............................................. G06F 13/00

[52] U.S. Cl. ..................................... 364/550; 364/559

[58] Field of Search .................... 364/552, 550, 551.01, 364/551.02, 559, 142, 469, 900; 365/221; 101/181, 183

[56] References Cited

U.S. PATENT DOCUMENTS

| | | | |
|---|---|---|---|
| 3,946,669 | 3/1976 | Johne et al. | 101/183 |
| 4,318,176 | 3/1982 | Stratton et al. | 364/900 |
| 4,433,426 | 2/1984 | Förster | 364/469 |
| 4,470,108 | 9/1984 | Kato et al. | 364/142 |
| 4,475,154 | 10/1984 | Kunz | 364/900 |
| 4,510,570 | 4/1985 | Yonekura | 364/142 |
| 4,545,031 | 10/1985 | Kobayashi | 364/900 |
| 4,839,789 | 6/1989 | Kumar et al. | 364/142 |

FOREIGN PATENT DOCUMENTS

| | | |
|---|---|---|
| 0160167 | 11/1985 | European Pat. Off. . |
| 3530035 | 4/1990 | Fed. Rep. of Germany . |
| 1294640 | 11/1972 | United Kingdom . |
| 1309335 | 3/1973 | United Kingdom . |
| 1392913 | 5/1975 | United Kingdom . |
| 2166235 | 4/1986 | United Kingdom . |

OTHER PUBLICATIONS

Fed. Rep. of Germany, publication "Elektronische Messtechnik" 1st Edition, 1976, Verlag Berliner Union, Stuttgart, article 17. Digitales Messen nach dem Inkrementalverfahren, pp. 269–272.

Fed. Rep. of Germany, publication Elektronik, 1975, Issue 1, article "Digitale Positionierung auf dem Bildschirm," by G. Gidl, pp. 61–67.

*Primary Examiner*—Parshotam S. Lall
*Assistant Examiner*—Michael Zanelli
*Attorney, Agent, or Firm*—Herbert L. Lerner; Laurence A. Greenberg

[57] ABSTRACT

A processor-controlled data input and output device includes a signal transducer for receiving signals providing information regarding a respective angular setting of a rotary cylinder, a transducer address-conversion circuit connected to the signal transducer, and at least one memory connected to the transducer address-conversion circuit. The transducer address-conversion circuit applies the information from the signal transducer as address information for the memory. The address-conversion circuit includes at least one counter connected to the signal transducer, the counter being in a state forming the address information. The address-conversion circuit further has the capability of respectively writing to and reading out the memory in a manner that input and output data, respectively, are stored in the memory and outputted from the memory, respectively, in accordance with the address information.

13 Claims, 4 Drawing Sheets

PROCESSOR-CONTROLLED DATA INPUT AND OUTPUT DEVICE

BACKGROUND OF THE INVENTION

1. Field of the Invention

The invention relates to a processor-controlled data input and output device and, more particularly, to such a device which assigns information deriving from a signal transducer or transmitter to the input and/or output data and has at least one memory. Such a device is especially suitable for detecting the position and/or change in position of material to be printed relative to the angular position of a cylinder or a rotary printing press.

From printing press technology, it is generally known, with respect to sheet-fed rotary presses, to monitor a sheet, which is grasped by a gripper system arranged in a longitudinal slot formed in a sheet-guiding cylinder of a rotary printing press, in terms of the position of the sheet at the point of transfer relative to the angular position of the cylinder. This monitoring is accomplished with a conventional detection device which scans the leading and/or trailing edge of the sheet. If there is a deviation between the instant of sheet transfer and the angular position of the cylinder which lasts longer than a predetermined tolerance limit, the sheet will then change its position on the cylinder relative to its normal or original position. This can have a negative effect upon the printing process. If this change in position is known, the following processing stations can be apprised thereof and can take suitable counter measures. The scanning of the sheet causes data to be outputted by the detection device, and provision may especially be made that when a sheet is not present, as compared with the detection of a sheet, a change in the data occurs. If the data are delivered to the conventional processor-controlled data input and output device, the reaction to such a change in data is dependent upon the reaction time of the processor. Thus, changes in input data are normally recognized by so-called polling interrogations or queries made to the input or inputs by the processor. If position information regarding the sheet-guiding cylinder is then to be assigned to the data change at the instant of change, the data of the data input and output device present at the instant of change must be supplied together with the data change and processed instantaneously thereat. In this regard the data originates, for example, from a signal transducer or transmitter which is entrained by or rotates with the sheet-feeding cylinder. The output of a data change is also obtained by polling.

To achieve great accuracy with respect to the coordination of the instant of sheet transfer and the angular position of the cylinder, or if several inputs and outputs, respectively, of data in brief succession are necessary, the reaction time of the processor, in the case of high-speed rotary presses, is insufficient. In order to shorten the reaction time to such input and output changes of data, respectively, it has become known heretofore to use alarm inputs or so-called interrupts. These interrupts are not always made available for the desired requirements, however, or may be interrupted themselves by other higher-priority interrupts. Accordingly, the problem has not been solved satisfactorily.

One possible but rather expensive alternative is to use a plurality of processors.

SUMMARY OF THE INVENTION

It is accordingly an object of the invention to provide a processor-controlled data input and output device of the foregoing general type which detects data changes reliably and precisely while providing a relatively simple and economical construction.

With the foregoing and other objects in view, there is provided, in accordance with the invention, a processor-controlled data input and output device, comprising means for assigning information derived from a signal transmitter or transducer to input and/or output data in the device. The device further comprises at least one memory for storing the data, the information from the signal transmitter or transducer serving as address information for the memory, and also includes means for writing into or reading out the memory in a manner that the data are stored in the memory or outputted in accordance with the address information.

In accordance with the invention, the signal transmission or transducer information thus addresses a predetermined number of locations in the memory, so that, for example, predetermined positions of an element acting upon the signal transmitter are respectively assigned an address. One memory location, for example encompassing eight bits, is assigned to each address. Thus the data (input data) applicable to the given positions of the element are read into the memory at the appertaining address assigned thereto.

If the ascertainment of the data is to be performed over a plurality of complete rotations of the element, in accordance with another feature of the invention, a given position can be assigned to several addresses; that is, identical angular positions of several rotations respectively receive a different address.

The outputting of the data occurs, correspondingly, in reverse order. The memory contents, together with the address information, furnish an accurate image of the process that has elapsed. If the element, for example, is the aforementioned sheet-guiding cylinder of the rotary printing press, and the signal transducer or transmitter is an incremental transducer or transmitter then, in accordance with the selected angular positions of the cylinder, one memory location, respectively, is assigned b.y way of the address information. This location is, for example, at zero potential whenever the detection device is not recording any sheet grasped by the gripper system of the cylinder, and assumes a value of 1 the instant the detection device detects the leading and/or trailing edge of a grasped sheet. These data and information are available until they are erased again after a given course of time, so that the processor can postpone the processing thereof or can distribute the processing thereof over a relatively long period of time. The change in data, for example the transition from "0" to "1", can be determined precisely, depending upon the fineness of the subdivided angular increments. It is possible, for example, to have one memory location occupied for each degree increment during the rotation of the cylinder. The subdivision becomes even finer if one datum or unit of address information is assigned to each tenth of a degree. If only one memory cell is required per each one-tenth of a degree, for example, then: $360^\circ \times 10^\circ = 3600$ increments $= 3600$ memory cells.

In accordance with another feature of the invention, the device comprises a transducer address-conversion circuit having at least one counter connected to the signal transmitter or transducer, the counter being in a state forming the address information. The counter counts the signals deriving from the signal transducer or transmitter during a partial rotation or one or more complete rotations of the cylinder. Preferably a logic circuit may be provided, which forms the information for incrementing the counter upwardly and downwardly based upon the states of the counter which represent the address information and the signal transducer or transmitter signals. This logic circuit may also generate read and write signals, which activate the memory to store input data therein, or to output output data.

In accordance with an added feature of the invention, the device serves for detecting a position and/or a change in position of material to be printed relative to an angular position of a cylinder of a rotary printing press. The device comprises a detection device for scanning the material to be printed, such as the edge of a sheet particularly, and for furnishing the input data, which may, furthermore, be single-digit or multi-digit data.

In accordance with an additional feature of the invention, the detection device has an optical scanning sensor. This sensor preferably monitors the sheet transfer region of the cylinder which is equipped with grippers so that a sheet gripped by the grippers is immediately detected by the scanning sensor due to changing light and reflection conditions, respectively.

The data stored in memory relating to a cylinder position to be processed are available over a particularly long period of time, if they are storable in memory or are readable out for longer than one complete rotation of the sheet-guiding cylinder. Storage in memory over the time period of a partial rotation of the cylinder is also possible. The processor is unburdened in the sense that it need not react immediately to these data, especially changes in state or condition. The coordination of the data with or assignment thereof to the angular position of the cylinder may also be determined, afterwards or beforehand, respectively, by means of the address in the memory. It is particularly advantageous if the oldest data, in terms of number of degrees and/or period of time, which are stored in the memory, are rewritten continuously with updated data. The number of memory locations required thus depends upon the desired memory time and upon the extent of subdivision of the rotational angle positions of the cylinder. Depending upon the intended use, the memory may also have a plurality of inputs and/or outputs for corresponding data. These data may be information that relate not only to the transporting of sheets, but also to other process parameters.

Therefore, in accordance with other features of the invention, the memory has a capacity of sufficient size for storing therein and reading out therefrom, respectively, the data assigned to predetermined angular increments occurring in at least one partial rotation, one complete rotation and more than one complete rotation of the sheet-feeding cylinder. Furthermore, the device according to the invention, includes means for continuously rewriting with updated data the data stored in the memory which are oldest in terms of at least one of gradation count and time. As aforementioned, in accordance with yet other features of the invention, the memory has a plurality of inputs and/or outputs for the data.

In accordance with yet further alternate features of the invention, the memory is formed of at least one RAM module having a dual-port logic or at least one dual-port RAM. An example of a suitable dual port Random Access Memory is the VT2130 or VT2131 of the German firm Bitronic G.m.b.H as shown and described in their publication dated September 1985.

In accordance with another feature of the invention, the memory comprises an input memory for the input data and an output memory for the output data.

In accordance with a further feature of the invention, the signal transmitter or transducer is an incremental transmitter or transducer driven by the sheet-guiding cylinder.

In accordance with an added feature of the invention, the signal transmitter or transducer is a timer.

In accordance with a concomitant feature of the invention, the processor-controlled input and output device is embodied as an integrated circuit.

Other features which are considered as characteristic for the invention are set forth in the appended claims.

Although the invention is illustrated and described herein as embodied in a processor-controlled data input and output device, it is nevertheless not intended to be limited to the details shown, since various modifications and structural changes may be made therein without departing from the spirit of the invention and within the scope and range of equivalents of the claims.

BRIEF DESCRIPTION OF THE DRAWINGS

The construction and method of operation of the invention, however, together with additional objects and advantages thereof will be best understood from the following description of specific embodiments when read in connection with the accompanying drawings, in which.

DETAILED DESCRIPTION OF THE PREFERRED EMBODIMENTS

Figure 1:
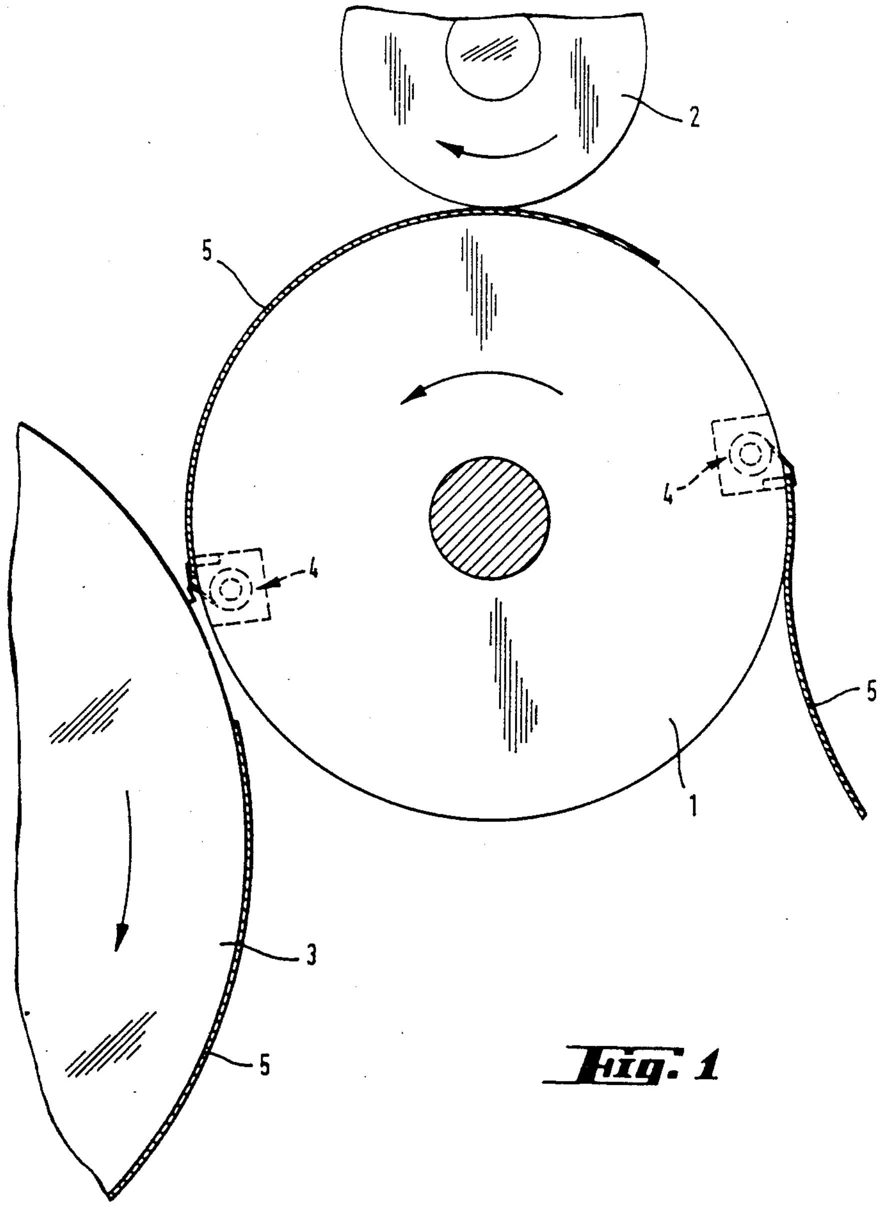
FIG. 1 is a diagrammatic side elevational view of a sheet-guiding cylinder of a sheet-fed rotary printing press having a gripper device.

Referring now to the drawing and, first, particularly to FIG. 1 thereof, there is shown therein a fragment of a sheet-fed rotary printing press having a cylinder 1 which, during the printing process, cooperates with other cylinders 2 and 3. The cylinder 1 is constructed as a sheet-guiding or transporting cylinder i.e. a cylinder to which a sheet 5 guided tangentially thereto can be secured with the aid of a gripper system, thereby entrained with the cylinder over a predetermined rotational angle, and subsequently transferred, for example, to the cylinder 3. The cylinder 1 of FIG. 1, in terms of its diameter, is so constructed that it can accommodate two sheets 5, simultaneously. To this end, two gripper systems 4 are provided. The gripper systems 4 are located in longitudinal grooves formed in the cylinder 1, and are actuated by means of the controls for the printing press.

Figure 4:
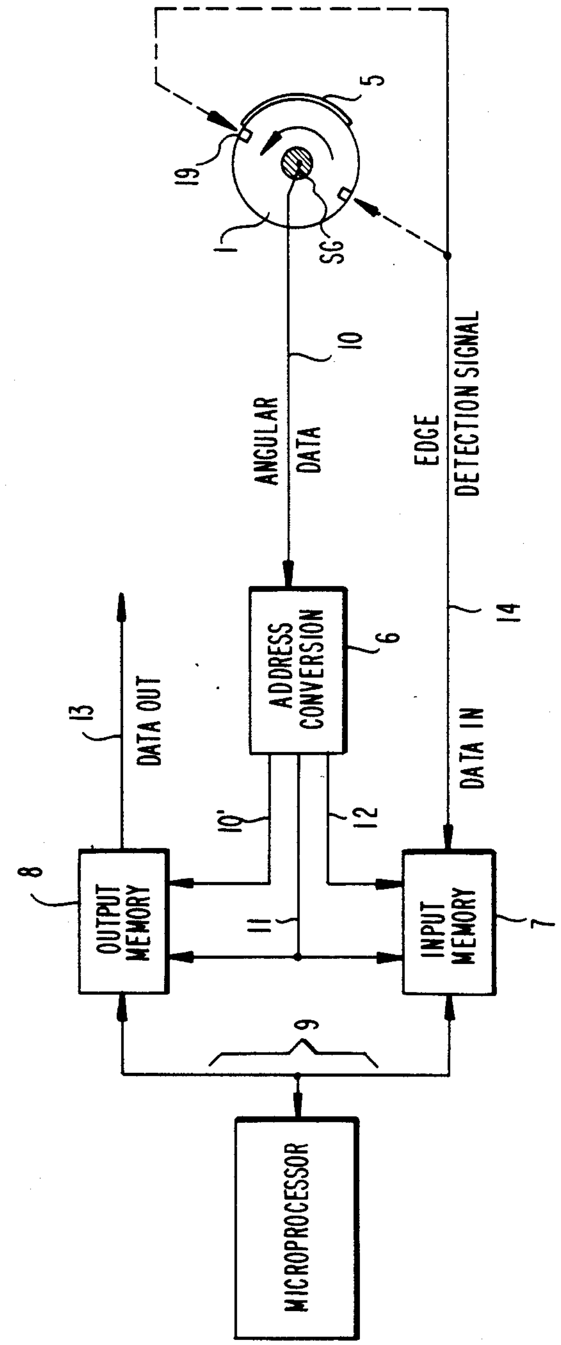
FIG. 4 is a block diagram of the combination of the processor-controlled input and output device and a detection device according to the invention.

For satisfactory printing results, it is important for the sheet 5 to be received i.e. gripped, each time by the gripper system 4 of the cylinder 1 at a particular angular position of the cylinder 1. If the sheet feeding speeds up or slows down, the predetermined angular position is abandoned i.e. not adhered to, which must be taken into account by the following machine components in any further processing of the sheet, if the printing results are not to be impaired. The precise angular position of the cylinder 1 must therefore be determined the instant the sheet 5 is fed thereto. To this end, as shown in FIG. 4, a detection device 19 is provided, which is disposed, for example, in the vicinity of the gripper system 4 inside the longitudinal groove and scans the edge of the fed sheet 5 by means of a conventional optical scanning sensor. When the angular position of the cylinder 1 is then detected at the instant of sheet feeding, a decision can be made as to whether the sheet feeding is taking place at the predetermined angular position and within a permissible range of tolerance with respect to this position, respectively, or the sheet feeding is occurring outside the tolerance range. This detection is performed by the processor-controlled data input and output device according to the invention shown in a block circuit diagram in FIG. 2.

Figure 2:
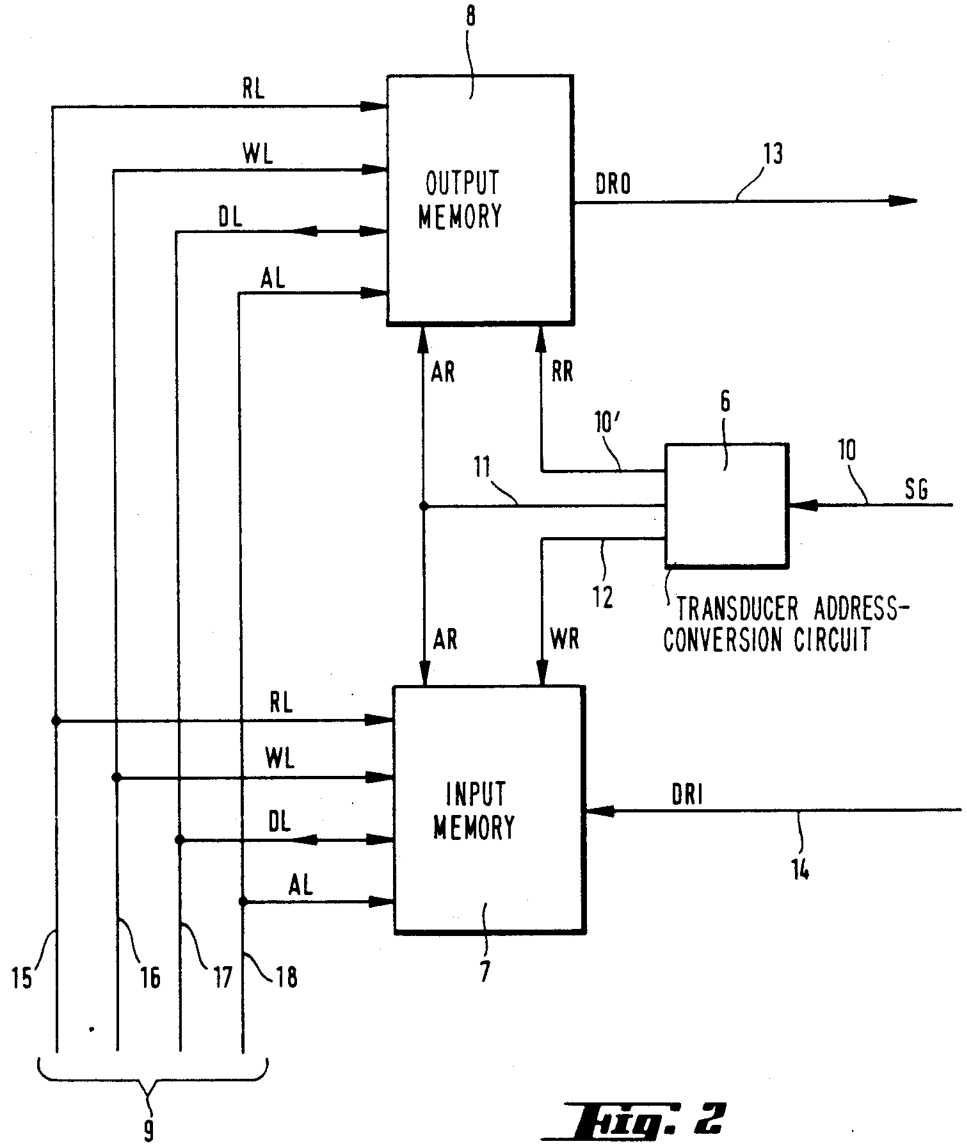
FIG. 2 is a block diagram of a processor-controlled input and output device according to the invention.

In FIG. 2, there is shown a transducer address-conversion circuit 6, an input memory 7, an output memory 8 and a processor bus 9. The transducer address-conversion circuit 6 is connected to a signal transducer SG, which is constructed as an incremental transducer. This incremental transducer is moved by the rotation of the cylinder 1 so that its output signals represent a standard for the angular position of the cylinder 1. A connecting line 10 between the signal transducer SG and the transducer address-conversion circuit 6 is shown in FIG. 2. Preferably, the signal line 10 is made up of three individual lines, two of which are intended for the pulses of the incremental transducer, while the remaining individual line carries one zero pulse for each rotation of the signal transducer SG. On the output side, as shown also in FIG. 4, lines 10', 11 and 12 are connected to the transducer address-conversion circuit 6. The line 10' leads to a read-right connection RR of the output memory 8, and the line 11 which, for example, is actually made up of twelve individual lines, is connected to address-right connections of the input memory 7 and the output memory 8. The number of individual lines depends on the number of memory locations required. If twelve individual lines are provided, for example, the result is then $2^{12}$ or 4096 memory locations per complete rotation. The line 12 is connected to the write-right WR connection of the input memory 7. From the output memory 8, a line 13 is connected to the data-right-out connection DRO. Leading to the input memory 7 is a line 14, which is connected to the data-right-in connection DRI. The lines 13 and 14 are each formed of eight individual lines in the case of an eight-bit memory organization. With a 16-bit organization, however, sixteen individual lines may also be provided.

The processor bus 9 has a total of four lines 15 to 18, of which the line 15 leads to the read-left connections RL, the line 16 leads to the write-left connections WL, the line 17 leads to the data-left connections DL and the line 18 leads to the address-left connections AL from the input memory 7 and the output memory 8. The line 17 is made up of eight or sixteen individual lines, depending upon whether an eight- or a 16-bit organization is used, so that the data can be read in an eight-bit or 16-bit mode, respectively. In accordance with what has been described hereinabove, the line 18 is formed of twelve individual lines.

Figure 3:
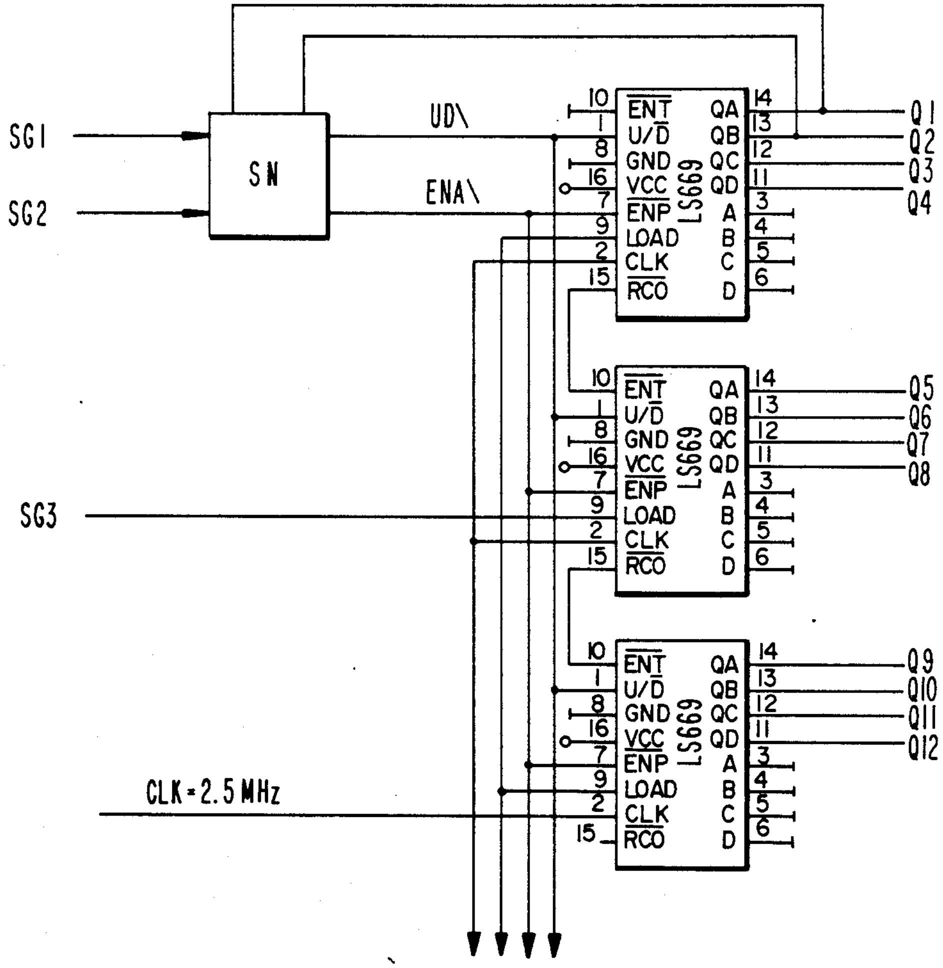
FIG. 3 is a block diagram of part of the device of FIG. 2 showing a transducer address-conversion circuit 6 in the form of an intermediate storage or memory.

FIG. 3 shows the address-converter 6 of FIG. 2 in greater detail. As clearly illustrated, the address-converter 6 is formed of three conventional integrated circuits LS669, each of which is made up of four flip-flops, the three integrated circuits LS669 forming a three-stage up/down counter having respective outputs Q1 to Q4, Q5 to Q8 and Q9 to Q12. The outputs, in turn, are connected to the dual port RAMs 7 and 8. A conventional circuit SN receives the signals SG1 and SG2 which are combined with outputs Q1 and Q2 from the up/down counter to generate an enable signal ENA and an up/down command UD to control the counter.

The thus constructed data input and output device operates in the following manner:

The pulses arriving from the signal transducer are fed via the line 10 to the transducer address-conversion circuit 6. The circuit 6 is formed of a number of counter modules and a small logic circuit shown in greater detail in FIG. 3. The counter modules count the signals arriving from the signal transducer during one or more rotations of the cylinder 1. Respective counter states thus formed in the transducer address-conversion circuit 6 furnish or represent address information for the input memory 7 and the output memory 8, which is delivered to those two memory units 7 and 8 via the line 11 and the address-right connections AR. The logic circuit in the address-conversion circuit 6 also forms signals for storage in a memory via the line 12 (write-right connection WR of the input memory 7) and for outputting information via the line 10' (read-right connection RR of the output memory 8). The data to be stored in memory (input data) are delivered via the line 14 to the DRI connection of the input memory 7. These data are the information furnished by the conventional non-illustrated detection device which scans the edge of the sheet 5.

The data to be outputted derive from the output memory 8, and are fed to the line 13 via the DRO connection.

The signals deriving from the signal transducer SG are then converted by the transducer address conversion circuit 6 in such a way, and fed via the line 11 to the address-right connections of the input memory 7 and output memory 8 so that a respective addressed memory location in the input memory 7 and output memory 8 is assigned to predetermined angular positions of the cylinder 1. It is thus possible, for example, for a respective memory location to be assigned to each angular degree of one or more rotations of the cylinder 1. Accuracy may be increased by subdividing the various angular positions even more finely, for example, in gradations of one-tenth of a degree. This would mean that $360° \times 10°$ or, in other words, 3600 memory locations would have to be made available. Via the line 12, information is conducted from the transducer address-conversion circuit 6 to the write-right connection WR of the input memory 7, which assures that a signal from the detection device present on the line 14 will be written into the memory location that corresponds to the particular angular position of the cylinder 1. For example, if feeding of the sheet 5 occurs at an angular position of 30° of the cylinder 1, and a one-tenth degree detection or determination is provided, then a "0" is written into the memory cells which correspond to angular positions of the cylinder 1 that are less than 30°. When the angular position of 30° is attained, the scanning sensor of the detection device records or registers the edge of the sheet 5 which is being fed, thereby resulting in the emission of a signal which is fed via the line 14 to the connection DRI of the input memory 7.

The memory location corresponding to the 30° position thereby has a "1" signal written thereon.

Outputting of the data recorded in the output memory 8 is effected in a corresponding manner via the line 11 connected to the address-right connection AR of the output memory 8, and via the line 10' which leads to the read-right connection RR of the output memory 8. The output signals are fed to the line 13 via the connection DRO. A conventional processor MP can then communicate with the input memory 7 and the output memory 8 via the processor bus 9. Because the memory contents, due to the address assignments or allocations, provide an accurate image of the statuses present at the various angular positions of the cylinder 1, with respect to the transfer of a sheet 5, and are available, for example, for the period of time of a partial rotation, or one complete rotation, or a plurality of rotations of the cylinder 1, the processor has sufficient time to react to a change in the data stored in memory. This change can always be evaluated whenever the detection device records or registers an edge of a sheet. Evaluation is not compulsory, however. It may or may not be performed depending upon the operating situation. It is no longer necessary, as in the prior art, to react immediately to changes in data with respect to the input or the output side. The use of so-called interrupts can be dispensed with. Furthermore, it is also unnecessary to use a plurality of processors.

One possible way to increase accuracy, as already described hereinbefore, may be to increase the number of memory locations for detecting or determining at smaller angular increments the positions of the cylinder 1. In this manner, the angular position of the sheet transfer can be recorded or registered very precisely. Preferably, the memory contents are rewritten again and again after a predetermined recording time (for example, a period of one complete rotation), and depending upon the choice of the "recording time" that the processor needs to react more or less quickly to a change in data. It is also possible to use only a part of the circuit when, for example, only the input of data or only the output of data takes place. Furthermore, one need not be restricted only to one output DRI or one output DRO, but rather, several of such connections for various signals can be provided. The number of inputs and/or outputs may also be reduced by using only one memory, which performs both data inputs and data outputs.

Furthermore, instead of providing the signal transducer in the form of an incremental transducer, a timing transducer can also be used for providing timing information for the circuit according to the invention.

The invention of the instant application is also not restricted to use in printing presses.

We claim:

1. In combination, a processor-controlled data input and output device comprising a signal transducer for receiving signals providing information regarding a respective angular setting of a rotary cylinder, a transducer address-conversion circuit connected to said signal transducer, and at least one memory connected to said transducer address-conversion circuit, said transducer address-conversion circuit having means for applying the information from said signal transducer as address information for said memory, said address-conversion circuit including at least one counter connected to said signal transducer, said counter being in a state forming the address information, said address-conversion circuit further including means for respectively writing to and reading out said memory in a manner that input and output data, respectively, are stored in said memory and outputted from said memory, respectively, in accordance with the address information, and means for detecting a position and/or a change in position of material to be printed relative to the angular setting of the cylinder in a rotary printing press, comprising a detection device for scanning the material to be printed and furnishing said input data.

2. A device according to claim 1, wherein said input data are single-digit or multi-digit data.

3. A device according to claim 1, wherein said detection device has an optical scanning sensor.

4. In combination, a processor-controlled data input and output device comprising a signal transducer for receiving signals providing information regarding a respective angular setting of a rotary cylinder, a transducer address-conversion circuit connected to said signal transducer, and at least one memory connected to said transducer address-conversion circuit, said transducer address-conversion circuit having means for applying the information from said signal transducer as address information for said memory, said address-conversion circuit including at least one counter connected to said signal transducer, said counter being in a state forming the address information, said address-conversion circuit further including means for respectively writing to and reading out said memory in a manner that input and output data, respectively, are stored in said memory and outputted from said memory, respectively, in accordance with the address information, and means for detecting a position and/or a change in position of material to be printed relative to the angular setting of the cylinder in a rotary printing press, wherein said memory has a capacity for storing therein and reading out therefrom, respectively, the data assigned to predetermined angular increments occurring in at least one of a partial rotation, one complete rotation and more than one complete rotation of said printing press cylinder.

5. A processor-controlled data input and output device comprising a signal transducer for receiving signals providing information regarding a respective angular setting of a rotary cylinder, a transducer address-conversion circuit connected to said signal transducer, and at least one memory connected to said transducer address-conversion circuit, said transducer address-conversion circuit having means for applying the information from said signal transducer as address information for said memory, said address-conversion circuit including at least one counter connected to said signal transducer, said counter being in a state forming the address information, said address-conversion circuit further including means for respectively writing to and reading out said memory in a manner that input and output data, respectively, are stored in said memory and outputted from said memory, respectively, in accordance with the address information, and means for continuously rewriting with updated data the data stored in said memory which are oldest in terms of at least one of gradation count and time.

6. A device according to claim 1, wherein said memory has a plurality of inputs for said data.

7. A device according to claim 1, wherein said memory has a plurality of outputs for said data.

8. A device according to claim 1, wherein said memory if formed of at least one RAM module having a dual-port logic.

9. A device according to claim 1, wherein said memory is formed of at least one dual-port RAM.

10. A device according to claim 1, wherein said memory comprises an input memory for said input data and an output memory for said output data.

11. A device according to claim 1, wherein the cylinder is a sheet-feeding cylinder of a printing press, and said signal transducer is an incremental transducer driven by the sheet-feeding cylinder.

12. A device according to claim 1, wherein said signal transducer is a timer.

13. A device according to claim 1, which is embodied as an integrated circuit.

* * * * *